(12) United States Patent
Akerib

(10) Patent No.: US 12,367,346 B2
(45) Date of Patent: Jul. 22, 2025

(54) NATURAL LANGUAGE PROCESSING WITH k-NN

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 1128 days.

(21) Appl. No.: 16/033,259

(22) Filed: Jul. 12, 2018

(65) Prior Publication Data

US 2018/0341642 A1   Nov. 29, 2018

Related U.S. Application Data

(60) Provisional application No. 62/686,114, filed on Jun. 18, 2018, provisional application No. 62/533,076, filed on Jul. 16, 2017.

(51) Int. Cl.
*G06F 40/30*   (2020.01)
*G06N 3/04*    (2023.01)
(Continued)

(52) U.S. Cl.
CPC .............. *G06F 40/30* (2020.01); *G06N 3/04* (2013.01); *G06N 3/042* (2023.01); *G06N 3/044* (2023.01);
(Continued)

(58) Field of Classification Search
CPC ...... G06N 3/04; G06N 3/0427; G06N 3/0445; G06N 3/0454; G06N 3/08; G06N 5/041; G06N 20/10; G06N 3/048; G06F 40/30
See application file for complete search history.

(56) References Cited

U.S. PATENT DOCUMENTS

| 5,014,327 A | 5/1991 | Potter |
| 5,799,300 A | 8/1998 | Agrawal |

(Continued)

FOREIGN PATENT DOCUMENTS

| JP | 2008276344 | 11/2008 |
| JP | 201633806 A | 3/2016 |

(Continued)

OTHER PUBLICATIONS

Miller et al. "Key-value memory networks for directly reading documents." arXiv preprint arXiv: 1606.03126 (Year: 2016).*

(Continued)

*Primary Examiner* — Michael J Huntley
*Assistant Examiner* — Adam C Standke
(74) *Attorney, Agent, or Firm* — Heidi Brun Associates Ltd.; Heidi M. Brun

(57) ABSTRACT

A system for natural language processing includes a memory array and a processor. The memory array is divided into a similarity section storing a plurality of feature vectors, a SoftMax section in which to determine probabilities of occurrence of the feature vectors, a value section storing a plurality of modified feature vectors, and a marker section. The processor activates the array to perform parallel operations in each column indicated by the marker section: a similarity operation in the similarity section between a vector question and feature vectors stored in indicated columns; a SoftMax operation in the SoftMax section to determine an associated SoftMax probability value for indicated feature vectors; a multiplication operation in the value section to multiply the associated SoftMax value by modified feature vectors stored in indicated columns; and a vector sum in the value section to accumulate an attention vector of output of the multiplication operation.

17 Claims, 17 Drawing Sheets

(51) Int. Cl.
*G06N 3/042* (2023.01)
*G06N 3/044* (2023.01)
*G06N 3/045* (2023.01)
*G06N 3/048* (2023.01)
*G06N 3/08* (2023.01)
*G06N 5/04* (2023.01)
*G06N 20/10* (2019.01)

(52) U.S. Cl.
CPC .............. *G06N 3/045* (2023.01); *G06N 3/08* (2013.01); *G06N 5/041* (2013.01); *G06N 3/048* (2023.01); *G06N 20/10* (2019.01)

(56) References Cited

U.S. PATENT DOCUMENTS

| | | | |
|---|---|---|---|
| 5,983,224 | A | 11/1999 | Singh |
| 8,099,380 | B1 | 1/2012 | Shahabi |
| 8,238,173 | B2 | 8/2012 | Akerib |
| 9,418,719 | B2 | 8/2016 | Akerib |
| 9,558,812 | B2 | 1/2017 | Akerib |
| 9,653,166 | B2 | 5/2017 | Akerib |
| 9,859,005 | B2 | 1/2018 | Akerib |
| 10,153,042 | B2 | 12/2018 | Ehrman |
| 10,210,935 | B2 | 2/2019 | Akerib |
| 10,249,362 | B2 | 4/2019 | Shu |
| 10,402,165 | B2 | 9/2019 | Lazer |
| 10,489,480 | B2 | 11/2019 | Akerib |
| 10,514,914 | B2 | 12/2019 | Lazer |
| 10,521,229 | B2 | 12/2019 | Shu |
| 10,534,836 | B2 | 1/2020 | Shu |
| 10,635,397 | B2 | 4/2020 | Lazer |
| 10,725,777 | B2 | 7/2020 | Shu |
| 10,777,262 | B1 | 9/2020 | Haig |
| 2013/0080490 | A1 | 3/2013 | Plondke |
| 2015/0131383 | A1* | 5/2015 | Akerib ............... G11C 13/004 365/189.011 |
| 2015/0146491 | A1* | 5/2015 | Akerib .................. G11C 7/18 365/189.02 |
| 2015/0200009 | A1* | 7/2015 | Akerib ................. G11C 15/00 711/114 |
| 2015/0332126 | A1 | 11/2015 | Hikida |
| 2016/0086222 | A1 | 3/2016 | Kurapati |
| 2016/0275876 | A1 | 9/2016 | Hagood |
| 2017/0103324 | A1* | 4/2017 | Weston .................. G06N 3/08 |

FOREIGN PATENT DOCUMENTS

| | | |
|---|---|---|
| KR | 2014008270 | 7/2014 |
| KR | 101612605 B1 | 4/2016 |

OTHER PUBLICATIONS

Sukhbaatar et al., "End-to-end memory networks." Advances in neural information processing systems 28 (Year: 2015).*

Li, Shuangchen, et al. "Pinatubo: A processing-in-memory architecture for bulk bitwise operations in emerging non-volatile memories." Proceedings of the 53rd Annual Design Automation Conference. (Year: 2016).*

Piombo et al., "Analog soft max circuit with dynamic gain control." Research in Microelectronics and Electronics, 2005 PhD. vol. 1. IEEE (Year: 2005).*

International Search Report for corresponding PCT application PCT/IB2017/54233 mailed on Jan. 12, 2018.

Machine Translation of Korean Publication 10-1612605 downloaded from the Korean Patent Office website on Oct. 15, 2020.

English Abstract of JP2008276344 downloaded from Google Patents on May 26, 2019.

Chatzimilioudis, Distributed In-Memory Processing of All k Nearest Neighbor Queries, IEEE Transaction on Knowledge and Data Engineering, Apr. 2016.

Rinkus, "A Cortex-inspired Associative Memory with O(1) Time Complexity Learning, Recall and Recognition of Sequences", Brandeis University, 2006.

Canal, "Memory Structure", Department d'Arquitectura de Computadors, Universitat Politecnica de Catalunya, Jul. 6, 2016.

ICS33 Lecture Note, "The Complexity of Python Operators/Functions"—ICS UCI, Donald Bren School of Information & Computer Sciences, 2014.

BIONB330 Reading Material, "Associative Memory", Cornell University, 2013.

Zhang, "k-nearest neighbors associative memory model for face recognition", AI 2005, LNAI 3809, pp. 540-549, 2005.

* cited by examiner

| | | | C | | | | | Decimal value | | Index | | | Index |
|---|---|---|---|---|---|---|---|---|---|---|---|---|---|
| 1 | 1 | 0 | 0 | 1 | 0 | 1 | 0 | 202 | 0 | 0 | 0 | 0 | 0 |
| 0 | 1 | 0 | 1 | 1 | 0 | 0 | 0 | 88 | 0 | 0 | 0 | 1 | 1 |
| 1 | 0 | 0 | 0 | 0 | 0 | 1 | 0 | 130 | 0 | 0 | 1 | 0 | 2 |
| 0 | 0 | 1 | 1 | 1 | 0 | 0 | 0 | 56 | 0 | 0 | 1 | 1 | 3 |
| 0 | 1 | 0 | 1 | 1 | 1 | 0 | 0 | 92 | 0 | 1 | 0 | 0 | 4 |
| 0 | 0 | 1 | 1 | 1 | 0 | 0 | 0 | 56 | 0 | 1 | 0 | 1 | 5 |
| 0 | 1 | 1 | 1 | 1 | 0 | 0 | 0 | 120 | 0 | 1 | 1 | 0 | 6 |
| 1 | 1 | 1 | 1 | 1 | 0 | 0 | 0 | 248 | 0 | 1 | 1 | 1 | 7 |
| 0 | 0 | 0 | 0 | 1 | 1 | 1 | 0 | 14 | 1 | 0 | 0 | 0 | 8 |
| 0 | 0 | 0 | 0 | 1 | 1 | 1 | 0 | 14 | 1 | 0 | 0 | 1 | 9 |
| 0 | 0 | 0 | 0 | 1 | 1 | 1 | 0 | 14 | 1 | 0 | 1 | 0 | 10 |

Fig. 11

|      |        |          |       | 1200 |
|------|--------|----------|-------|------|

| Row | Vector | Location | X-kept | RSP |
|-----|--------|----------|--------|-----|
| 0   | y      | 0        | 0      | X   |
| 1   | y      | 0        | 0      | X   |
| ... | y      | 0        | 0      |     |
| n   | X      | 1        | X      | X   |
| ....| y      | 0        | 0      | X   |
|     |        |          | RSP signal = X |  |

NATURAL LANGUAGE PROCESSING WITH k-NN

CROSS REFERENCE TO RELATED APPLICATIONS

This application claims priority and benefit from U.S. provisional patent applications 62/533,076, filed Jul. 16, 2017 and 62/686,114, filed Jun. 18, 2018, both of which are incorporated herein by reference.

FIELD OF THE INVENTION

The present invention relates to associative computation generally and to data mining algorithms using associative computation in particular.

BACKGROUND OF THE INVENTION

Data mining is a computational process of discovering patterns in large datasets. It uses different techniques to analyze the datasets. One of these techniques is classification, a technique used to predict group membership of new items on the basis of data associated with items in the dataset whose group membership is known. The k-Nearest Neighbors algorithm (k-NN) is one of the known data mining classification methods used in many fields where machine learning procedures are used such as, but not limited to, bioinformatics, speech recognition, image processing, statistical estimation, pattern recognition among other numerous applications.

In a large dataset of objects (e.g. products, images, faces, voices, texts, videos, human conditions, DNA sequences and the like), each object may be associated with one of numerous predefined classes (for example, product classes may be: clocks, vases, earrings, pens, etc.). The number of classes may be small or large and each object, in addition to being associated with a class, may be described by a set of attributes (e.g. for products: size, weight, price, etc.). Each of the attributes may be further defined by a numerical value (e.g. for product size: such as width of 20.5 cm and the like). The goal of the classification procedure is to identify the class of an unclassified object (for which the class in not yet defined) based on the value of the objects' attributes and their resemblance to already classified objects in the dataset.

The K-nearest neighbors algorithm first calculates the similarity between an introduced object X (unclassified) and each and every object in the dataset. The similarity is defined by the distance between the objects such that the smaller the distance is the more similar the objects will be, and there are several known distance functions that may be used. After the distance is calculated between the new introduced object X and all the objects in the dataset, the k nearest neighbors to X may be selected, where k is a pre-defined number defined by the user of the K-nearest neighbors algorithm. X is assigned to the class most common among its k nearest neighbors.

The K-nearest neighbors algorithm, among other algorithms, needs to analyze large unsorted datasets very quickly and efficiently in order to quickly access the smallest or largest, i.e. extreme, k items in the dataset.

One method for finding these k smallest/largest items in the dataset may be to first sort the dataset such that the numbers are arranged in order and the first (or last) k numbers are the desired k items in the dataset. Numerous sorting algorithms are known in the art and can be used.

One in-memory sorting algorithm is described in U.S. patent application Ser. No. 14/594,434, filed on Jan. 1, 2015 and assigned to the common assignee of the present application. This algorithm may be used to sort the numbers in a set by initially finding a first minimum (or maximum), then finding a second minimum (or maximum), and subsequently repeating the process, until all the numbers in the dataset have been sorted from minimum to maximum (or from maximum to minimum). The computation complexity of the sort algorithm described in U.S. patent application Ser. No. 14/594,434 is O(n) when n is the size of the set (as there are n iterations to sort the whole set). If the computation is stopped at the k-th iteration (if used for finding the first k minimum/maximum value), the complexity may be O(k).

SUMMARY OF THE PRESENT INVENTION

There is therefore provided, in accordance with a preferred embodiment of the present invention, a system for natural language processing. The system includes a memory array and an in-memory processor. The memory array has rows and columns and is divided into a similarity section initially storing a plurality of feature or key vectors, a SoftMax section in which to determine probabilities of occurrence of the feature or key vectors, a value section initially storing a plurality of modified feature vectors, and a marker section. Operations in one or more columns of the memory array are associated with one feature vector to be processed. The in-memory processor activates the memory array to perform the following operations in parallel in each column indicated by the marker section:

a similarity operation in the similarity section between a vector question and each feature vector stored in each indicated column;

a SoftMax operation in the SoftMax section to determine an associated SoftMax probability value for each indicated feature vector;

a multiplication operation in the value section to multiply the associated SoftMax value by each modified feature vector stored in each indicated column; and a vector sum operation in the value section to accumulate an attention vector sum of output of the multiplication operation. The vector sum is used to generate a new vector question for a further iteration or to generate an output value in a final iteration.

Moreover, in accordance with a preferred embodiment of the present invention, the memory array includes operational portions, one portion per iteration of a natural language processing operation, each portion being divided into the sections.

Further, in accordance with a preferred embodiment of the present invention, the memory array is an SRAM, a non-volatile, a volatile, or a non-destructive array.

Still further, in accordance with a preferred embodiment of the present invention, the memory array includes a multiplicity of bit line processors, one per column of each section, each bit line processor operating on one bit of data of its associated section.

Additionally, in accordance with a preferred embodiment of the present invention, the system also includes a neural network feature extractor to generate the feature and modified feature vectors.

Further, in accordance with a preferred embodiment of the present invention, the feature vectors include features of a word, a sentence, or a document.

Still further, in accordance with a preferred embodiment of the present invention, the feature vectors are the output of a pre-trained neural network.

Additionally, in accordance with a preferred embodiment of the present invention, the system also includes a pre-trained neural network to generate an initial vector question.

Moreover, in accordance with a preferred embodiment of the present invention, the system also includes a question generator to generate a further question from the initial vector question and the attention vector sum.

Further, in accordance with a preferred embodiment of the present invention, the question generator is a neural network.

Alternatively, in accordance with a preferred embodiment of the present invention, the question generator is implemented as a matrix multiplier on bit lines of the memory array.

There is also provided, in accordance with a preferred embodiment of the present invention, a method for natural language processing. The method includes having a memory array having rows and columns, the memory array being divided into a similarity section initially storing a plurality of feature or key vectors, a SoftMax section in which to determine probabilities of occurrence of the feature or key vectors, a value section initially storing a plurality of modified feature vectors, and a marker section, wherein operations in one or more columns of the memory array are associated with one feature vector to be processed and activating the memory array to perform the following operations in parallel in each column indicated by the marker section. The operations are: performing a similarity operation in the similarity section between a vector question and each feature vector stored in each indicated column, performing a SoftMax operation in the SoftMax section to determine an associated SoftMax probability value for each indicated feature vector, performing a multiplication operation in the value section to multiply the associated SoftMax value by each modified feature vector stored in each indicated column, and performing a vector sum operation in the value section to accumulate an attention vector sum of output of the multiplication operation. The sum is used to generate a new vector question for a further iteration or to generate an output value in a final iteration.

Further, in accordance with a preferred embodiment of the present invention, the memory array includes a multiplicity of bit line processors, one per column of each section, and the method additionally includes each bit line processor operating on one bit of data of its associated section.

Still further, in accordance with a preferred embodiment of the present invention, the method also includes generating the feature and modified feature vectors with a neural network and storing them into the similarity and value sections, respectively.

Moreover, in accordance with a preferred embodiment of the present invention, the method also includes generating an initial vector question using a pre-trained neural network.

Additionally, in accordance with a preferred embodiment of the present invention, the method also includes generating a further question from the initial vector question and the attention vector sum.

Further, in accordance with a preferred embodiment of the present invention, the generating a further question utilizes a neural network.

Finally, in accordance with a preferred embodiment of the present invention, the generating a further question includes performing matrix multiplication on bit lines of the memory array.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 7-11 are illustrations of an example of the calculation steps of the k-Mins processor, constructed and operative according to a preferred embodiment of the present invention, on the exemplary data set of FIG. 3;

FIG. 12 is a schematic illustration of one embodiment of an efficient shift for using in a count operation used by the k-Mins processor;

Figure 1A:
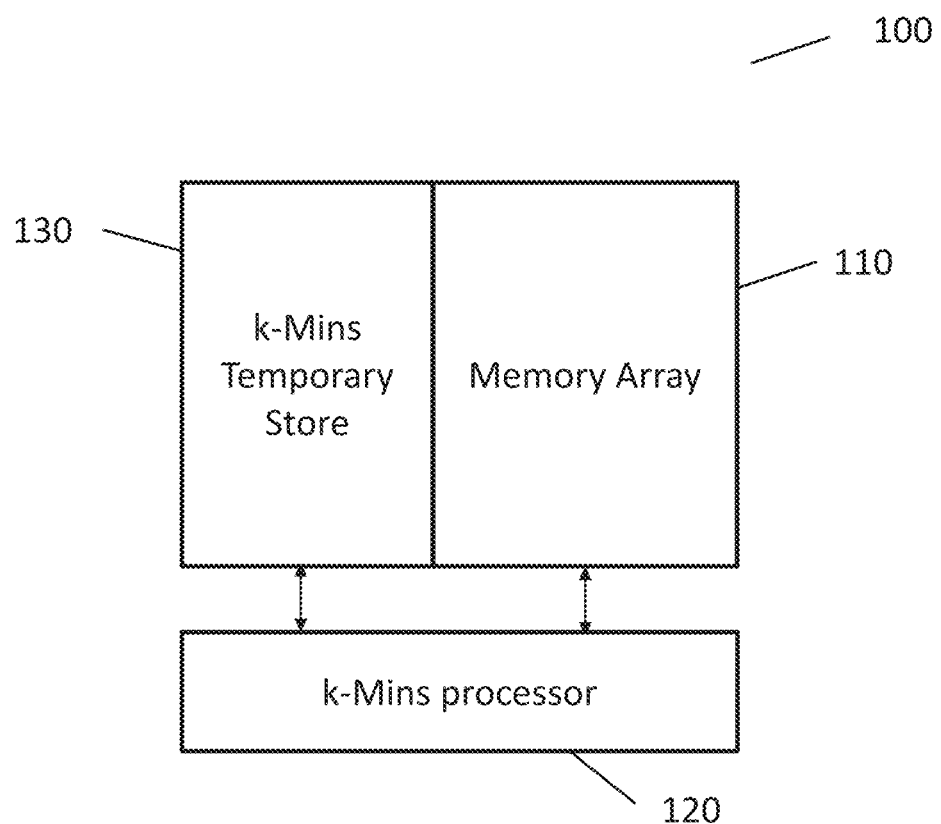
FIGS. 1A and 1B are logical and physical schematic illustrations of a memory computation device, constructed and operative in accordance with a preferred embodiment of the present invention, for computing the k extreme values in a constant time.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that sorting a dataset to find the k-minimum values when the dataset is very large is not efficient as the complexity of known sort mechanisms is proportional to the dataset size. As the dataset grows, the effective time to respond to a request to retrieve k minimum values from the dataset will increase.

Applicant has further realized that associative memory devices may be used to store large datasets and the associative computation may provide an in-memory method for finding k-minimum values in any sized dataset having a constant computation complexity (O(l)) which is proportional only to the size of an object in the dataset and not to the size of the dataset itself.

Memory devices that may provide such constant complexity are described in U.S. patent application Ser. No. 12/503,916 filed on Jul. 16, 2009, now U.S. Pat. No. 8,238,173; U.S. patent application Ser. No. 14/588,419, filed on Jan. 1, 2015; U.S. patent application Ser. No. 14/594,434 filed Jan. 12, 2015, now U.S. Pat. No. 9,859,005; U.S. patent application Ser. No. 14/555,638 filed on Nov. 27, 2014, now U.S. Pat. No. 9,418,719 and U.S. patent application Ser. No. 15/146,908 filed on May 5, 2016, now U.S. Pat. No. 9,558,812, all assigned to the common assignee of the present invention.

Applicant has also realized that associative computation may provide, in addition to a constant computation complexity, a quick and efficient method to find the k minimum values with minimum latency per request. In addition, data inside the associative memory is not moved during computation and may remain in its original memory location prior to computation.

It may be appreciated that increasing the dataset size may not affect the computation complexity nor the response time of a k-Mins query.

Figure 1B:
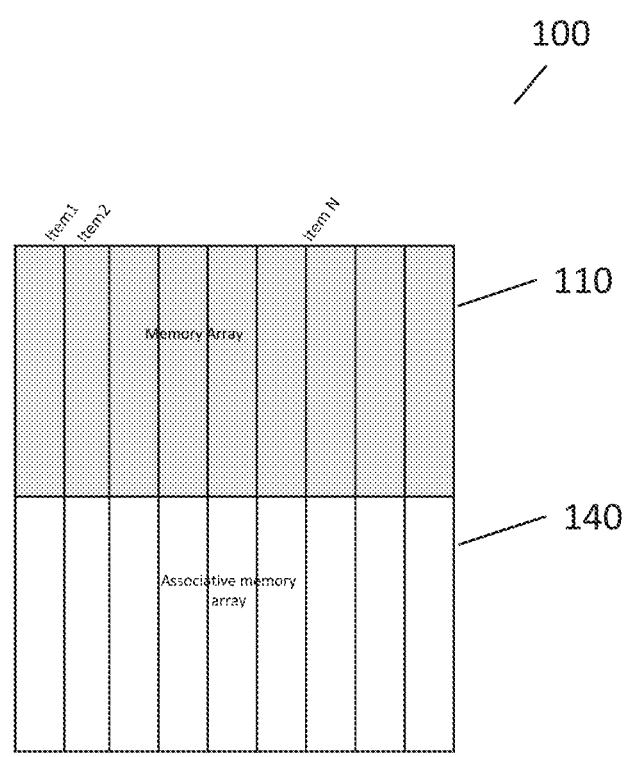

Reference is now made to FIGS. 1A and 1B, which are schematic illustrations of a memory computation device 100, constructed and operative in accordance with a preferred embodiment of the present invention. As illustrated in FIG. 1A, device 100 may comprise a memory array 110 to store a dataset, a k-Mins processor 120, implemented on a memory logic element, to perform a k-Mins operation and a k-Mins temporary store 130 that may be used for storing intermediate and final results of operations made by k-Mins processor 120 on data stored in memory array 110. In FIG. 1B the physical aspects of k-Mins processor 120 and the k-Mins temporary store 130 are illustrated in associative memory array 140. Associative memory array 140 combines the operations of k-Mins processor 120 and the store of k-Mins temporary store 130. Memory array 110 may store a very large dataset of binary numbers. Each binary number is comprised of a fixed number of bits and is stored in a different column in memory array 110. K-Mins temporary store 120 may store copies of the information stored in memory array 110 and several vectors storing temporary information related to a step of the computation performed by k-Mins processor 120 as well as the final result including an indication of k columns storing the k lowest values in the dataset.

It may be appreciated that the data stored in memory array 110 and in associative memory array 120 may be stored in columns (to enable the performance of Boolean operations as described in US patent applications mentioned hereinabove). However, for clarity, the description and the figures provide the logical view of the information, where the numbers are displayed horizontally (on a row). It will be appreciated that the actual storage and computations is done vertically.

Figure 2:
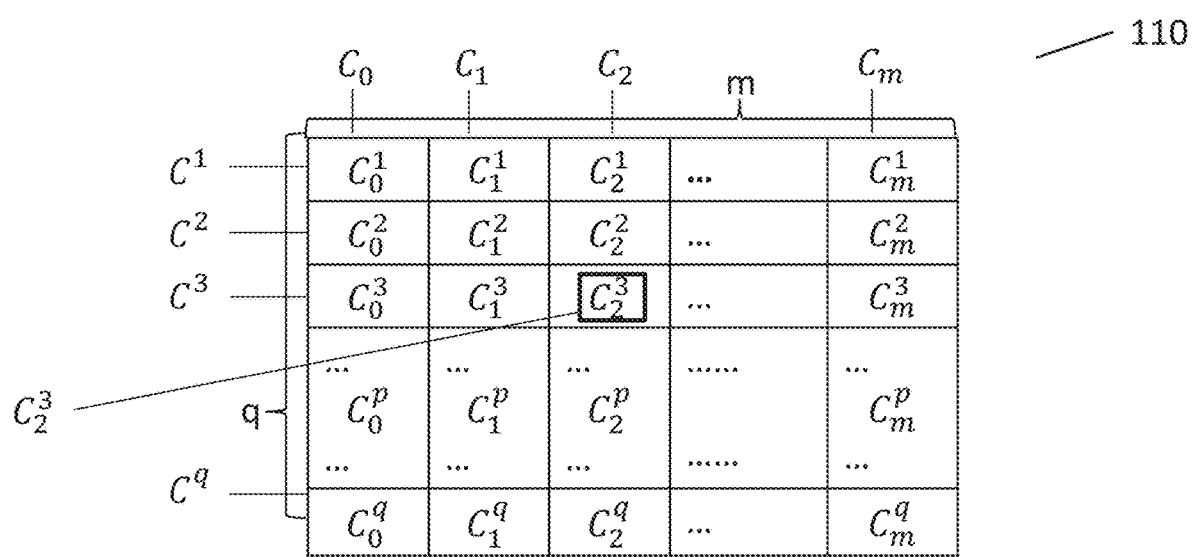
FIG. 2 is a schematic illustration of a dataset C stored in a memory array.

FIG. 2, to which reference is now made, is a schematic illustration of a dataset C, stored in a memory array 110. As already mentioned hereinabove, the rows of dataset C are stored as columns in memory array 110. Dataset C may store multi-bit binary numbers in q rows. Each binary number in dataset C is referred to as $C^p$ where p is the row identifier in memory array C where the binary number is stored. Each number $C^p$ is comprised of m bits $[C_0^p\ C_1^p\ C_2^p\ C_3^p\ \ldots\ C_m^p]$ where $C_i^p$ represents bit i of the binary number stored in row p. The value of m (number of bits comprising a binary number) may be 8, 16, 32, 64, 128 and the like.

As mentioned above, $C^p$ represents a row (p) in array C where (p=1 . . . q), $C_i$ represents a column (i) in array C where (i=1 . . . m) and $C_i^p$ represents a cell (the intersection of row p and column i) in array C where (p=1 . . . q; i=1 . . . m). The item in row 3 column 2 in FIG. 2, referred as $C_2^3$, is marked with a square.

Figure 3:
FIG. 3 is an example of a dataset C.

FIG. 3, to which reference is now made, is an example of a dataset C that has 11 binary numbers, i.e., q=11. Each row is labeled with an identifier starting at 0 through 10. The binary numbers in the exemplary dataset C has 8 bits each, the bits stored in column labeled bit 7 through bit 0, and in this example m=8. The decimal value of each binary number is presented to the right of each row. The desired amount of smallest binary number to be found in this example may be set to 4 i.e. k=4 and it may be appreciated that the four smallest numbers in the dataset of FIG. 3 are: (a) number 14 which is stored in row 9; (b) number 56 which is stored in row 5; (c) number 88 stored in row 1 and (d) number 92 which is stored in row 4.

The k-Mins processor 120, constructed and operative in accordance with a preferred embodiment of the present invention, may find the k smallest binary numbers in the large dataset C. The group of the k smallest numbers in dataset C is referred to as the k-Mins set and it may have k numbers. The k-Mins processor 120 may create the k-Mins set by scanning the columns $C_i$ of dataset C from the MSB (most significant bit) to the LSB (least significant bit) and concurrently selecting rows $C^p$ where $C_i^p$ is 0 to continue with to the next step. It may be appreciated that a binary number having the value 0 in a specific location (its i-th bit) is smaller than a binary number having the value 1 in the same location.

The amount of selected rows is compared to the target rows k. If the amount of selected rows is bigger than k, the k-Mins processor 120 may continue to scan the next bit of the already selected rows, as there are too many rows, and the set should be further reduced. (The rows that were not selected may contain binary numbers with larger values, thus they are not considered in the rest of the computation). If the amount of selected rows is smaller than k, k-Mins processor 120 may add the selected rows to the k-Mins set and may continue to scan the next bits in all remaining binary numbers. (The amount of selected rows is not enough so additional, rows having bigger binary numbers should be considered). If the amount of selected rows is exactly k, k-Mins processor 120 may stop its processing as the k-Mins set may include k items as required.

It may be noted that when k=1, the k-Mins set contains a single number which is the global minimum of the entire dataset. It may also be appreciated that there may be more than one instance with this value in the dataset and the first instance of this value will be chosen as the member of the k-Mins set.

It may be appreciated that k-Mins processor 120 may be built with the information where the bits of the binary numbers of dataset C are stored in memory array 110. In the example of FIG. 3, the binary numbers are displayed in rows where the MSB is the leftmost bit, the LSB is the rightmost bit and all other bits are in-between. In addition, the arrangement of the binary numbers in memory array 110 is such that the bits in the i-th location of all binary numbers of dataset C are located in the same row $C_i$ in memory array 110. i.e. the MSB of all binary numbers in dataset C may be in the same row, the LSB of all binary numbers in dataset C may be on the same row and so are all the bits in between.

Figure 4:
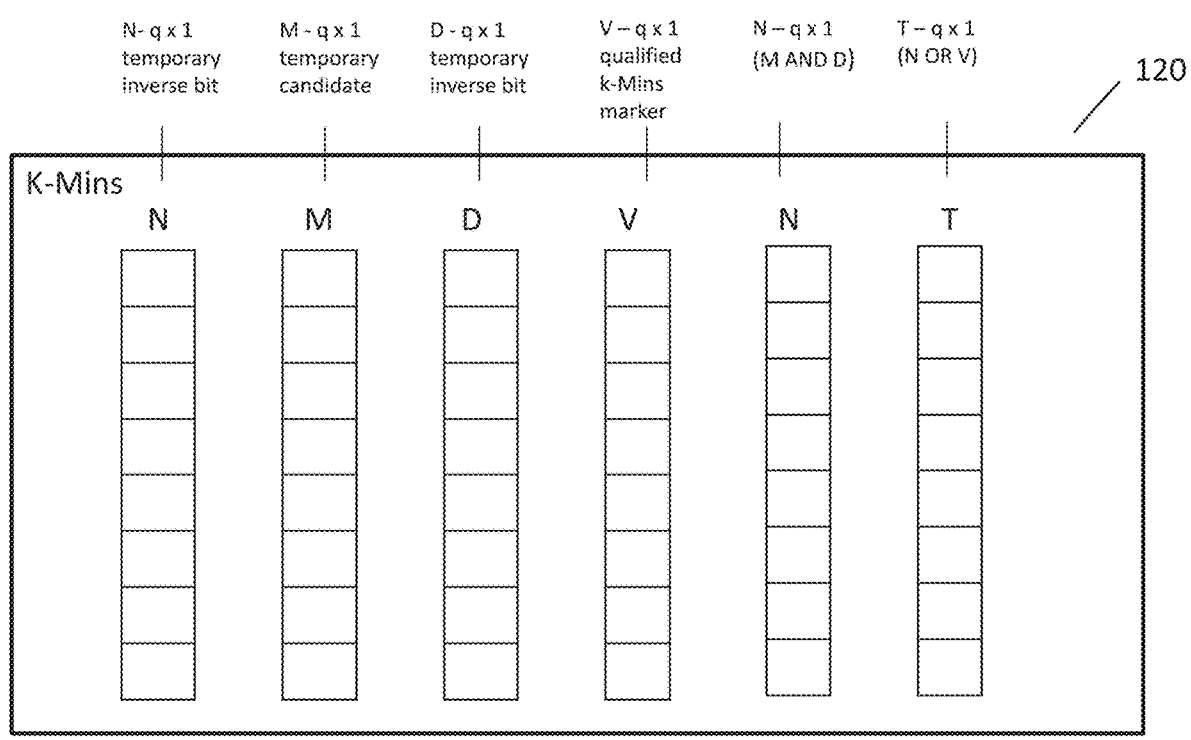
FIGS. 4 and 5 are schematic illustrations of temporary storage used for computation.
Figure 5:
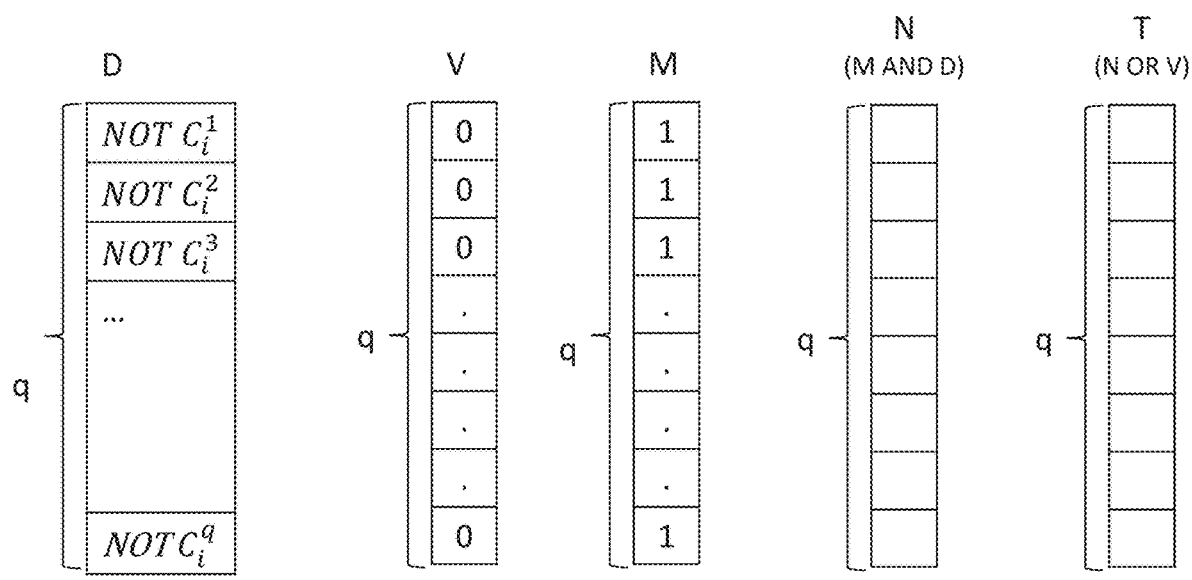

FIGS. 4 and 5, to which reference is now made, are schematic illustrations of k-Mins temporary storage 120, constructed and operative in accordance with a preferred embodiment of the present invention. K-Mins temporary storage 120 may comprise intermediate information stored in vectors. The vectors used by k-Mins processor 120 are: vector D—a temporary inverse vector; vector V—a qualified k-Mins marker vector; vector M—a candidate's vector; vector N—a temporary candidates vector and vector T—a temporary membership vector. The size (number of rows) of all vectors used in k-Mins section 120 is q and is identical to the number of rows in dataset C. Each vector stores in each row an indication relevant to the binary number stored in the associated row in dataset C with regards to the k-Mins set, such as being part of the set, being a candidate to join the set etc. It may be appreciated that the vectors, as the whole dataset, are physically stored in rows in memory array 110, but for clarity are drawn as columns.

Vector D is a temporary inverse vector that may contain the inverse value of the bits of column $C_i$ being processed by k-Mins processor 120. As already noted hereinabove, bits of the binary numbers of dataset C may be processed from MSB to LSB and at each step k-Mins processor 120 may process another row i of memory array 110.

Vector D is the inverse of the processed column $C_i$ in dataset C:

$$D = \text{NOT } C_i.$$

Any row p in vector D having a value of 1, (i.e. $D^P=1$), may indicate that the value of the original bit stored in cell $C_i^p$ (row p of dataset C) was 0, indicating that the binary number stored in row p of dataset C may be a candidate to participate in the k-Mins set. Similarly, all rows p in vector D having a value of 0, (i.e. $D^P=0$), may indicate that the value of the original bit stored in cell $C_i^p$ (row p of dataset C) was 1, indicating that the relevant binary number from dataset C may not be a candidate to participate in the k-Mins set as it is larger than other numbers from the dataset being evaluated.

Vector V is a qualified k-Mins marker vector, keeping the list of all rows in dataset C having binary numbers that are (already) part of the k-Mins set. As all other vectors used by the algorithm, it is a q sized vector maintaining in each row p the final indication $V^P$ whether binary number $C^P$ in dataset C belongs to the k-Mins set Any row p in vector V having a value of 1, (i.e. $V^P=1$), may indicate that the value of the binary number stored in the same row p of dataset C is qualified as a k-Mins set member. Similarly, all rows p in vector V having a value of 0, (i.e. $V^P=0$), may indicate that the binary number stored in row p of dataset C is not qualified to be part of the k-Mins set.

Vector V may be initiated to all 0 as the k-Mins set is empty at the beginning of the computation. At the end of the computation, V may include k qualification indications (i.e. the value of k bits in vector V may be 1 and the value of all other bits may be 0). Once a bit $V^P$ in vector V is set to 1 during computation, the associated binary number $C^P$ in C is part of the k-Mins set and may not stop being a part of the k-Mins set. The indication in vector V may only be set. The indication may not be "unset" further along the computation process, while the k-Mins processor continues to the next column in dataset C. (As the columns are processed from MSB to LSB a number that is defined as the smallest may not change its nature and become bigger when the next column is processed).

Vector M is a candidacy vector, maintaining a list of all rows in dataset C having numbers that can potentially be part of the k-Mins set. The associated binary numbers in dataset C were not yet added to the k-Mins set, however they were also not yet excluded from the set and may potentially join the set further along the prosecution of k-Mins processor 120. As all other vectors used by k-Mins processor 120, it is a q sized vector maintaining in each row p an indication $M^P$ whether binary number $C^P$ in dataset C may still be considered as a candidate to join the k-Mins set.

Any row p in vector M having a value of 1, (i.e. $M^P=1$), may indicate that the value of the binary number stored in row p of dataset C may be a candidate to join the k-Mins set. Similarly, all rows p in vector M having a value of 0, (i.e. $M^P=0$), may indicate that the binary number stored in row p of dataset C may no longer be considered as a candidate to join the k-Mins set.

Vector M may be initiated to all 1 as all numbers in dataset C may potentially be part of the k-Mins set, as the set may not be sorted and the numbers may be randomly spread.

Once a bit $M^P$ in vector M is set to 0 during computation, it indicates that the associated binary number $C^P$ in C may no longer be considered as a potential candidate of the k-Mins set and the indication may not change back further along the computation process, while the k-Mins processor 120 continues to the next bit in turn to evaluate. A binary number that may cease from being a candidate is bigger than other binary numbers, so it may be permanently excluded from further evaluation.

Vector N is a temporary candidacy vector, maintaining for each row p a temporary indication $N^P$ whether number $C^P$, not yet in V, may still be considered as a candidate to join the k-Mins, taking into account the current candidacy status of the binary number according to past processed bits of $C^P$ as indicated by vector M, and the value of the current processed bit whose inverse value may be stored in vector D. N is the logical AND of vector M and vector D.

$$N = M \text{ AND } D$$

Any row p in vector N having a value of 1, (i.e. $N^P=1$) may indicate that the value of the binary number stored in row p of dataset C is still a candidate to join the k-Mins set. Similarly, all rows p in vector N having a value of 0, (i.e. $N^P=0$), may indicate that the binary number stored in row p of dataset C may no longer be considered to be a candidate to join the k-Mins set. $N^P$ will be 1 if and only if binary number $C^P$ was not previously precluded from being a candidate (i.e. $M^P=1$), and the current inspected bit in C is 0, i.e. $D^P=1$.

Vector T is a temporary membership vector maintaining for each row p a temporary indication $T^P$ whether binary number $C^P$ is potentially a member of the k-Mins set, i.e. is either already in the k-Mins set (has an indication in vector V) or is a candidate to join the k-Mins set (has an indication in vector N). T is the logical OR of vector N and vector V.

$$T = N \text{ OR } V$$

Any row p in vector T having a value of 1, (i.e. $T^P=1$), may indicate that the value of the binary number stored in row p of dataset C may be considered as a temporary member of the k-Mins set and all rows p in vector T having a value of 0, (i.e. $T^P=0$), may indicate that the relevant binary number may not be a member of the k-Mins set.

As mentioned hereinabove, the k-Mins processor 120 may work simultaneously on all numbers $C^P$ stored in dataset C and may iterate over their bits from MSB to LSB. It may start with an empty group (V=0) and may assign a candidacy status to all binary numbers in the dataset (M=1). In each step of k-Mins processor 120, the inverse of bits $C_i^P$ of column $C_i$ (D=NOT C) are evaluated (to find the k maximum values, the $C_i$ are evaluated instead of their inverse value). If the value of D is 0 (i.e. $C_i^P$=1), number $C^P$ is too large to join the k-Mins set and may potentially be removed from the candidate list N (N=M AND D). The number of candidates is calculated (CNT=COUNT(N OR V)) and compared to the needed size of the k-Mins group—k.

If CNT (the potential binary numbers in the k-Mins set) is smaller than needed (CNT<k), all the candidates may become qualified (V=N OR V) and the search may continue (as there are not enough qualified members in the k-Mins set).

If CNT is larger than needed (CNT>k), all the binary numbers having a bit value of 1 in the current inspected bit may be removed from the candidate list (M=N), reducing the number of candidates. The remaining candidates may continue to the next step.

If CNT fits the needed value (CNT=k) all the candidates may become qualified (V=N OR V) and the computation of k-Mins processor 120 may end.

Figure 6:
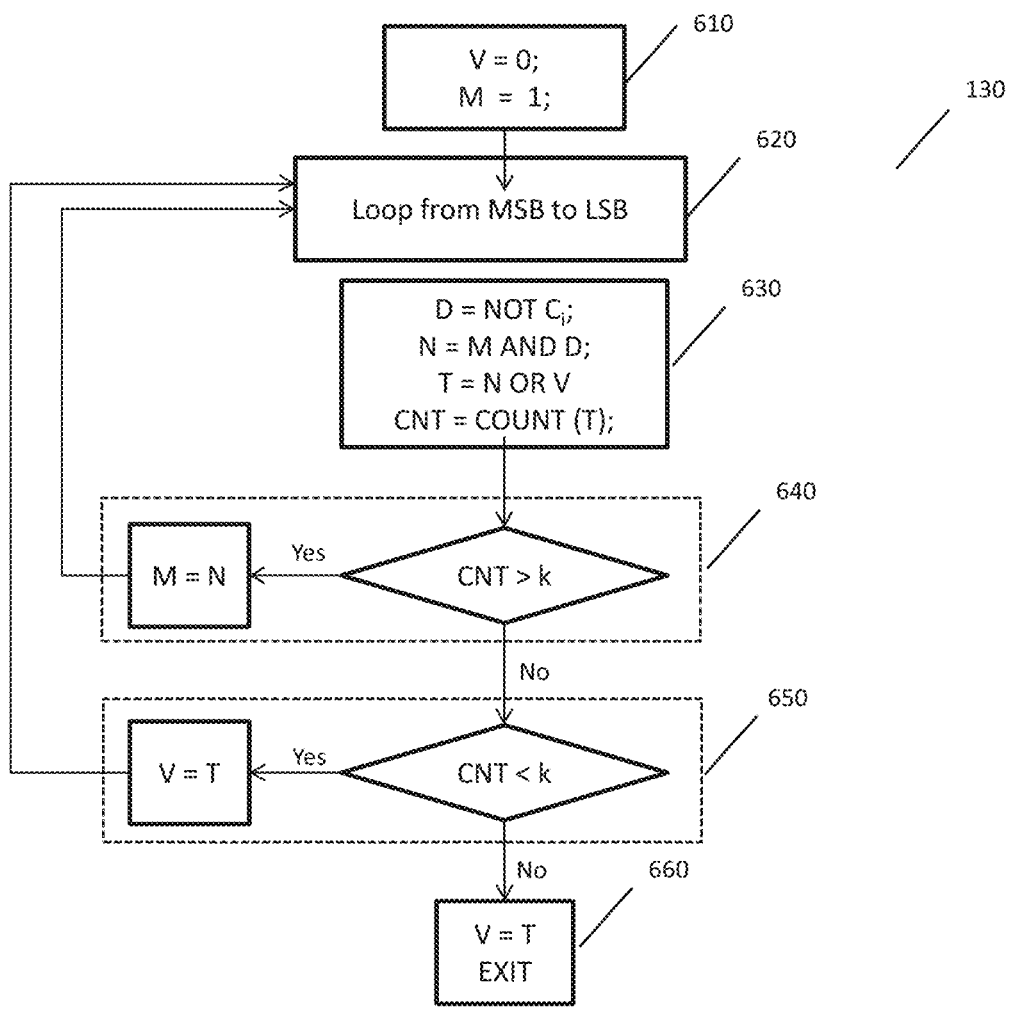
FIG. 6 is a flow chart describing the computation steps of the k-Mins processor.

FIG. 6, to which a reference is now made, is a flow diagram of the k-Mins processor 120 functional steps, constructed and operative accordance to a preferred embodiment of the present invention. The k-Mins processor 120 functional steps comprise: init 610, loop 620, calculate vectors 630, large set 640, small set 650, and proper set 660. The processing steps of k-Mins processor 120 are also provided hereinbelow as a pseudocode.

Init 610 may initialize vector V to 0 as the k-Mins set may start with an empty set and may initialize vector M to 1 as all binary numbers in dataset C may be candidates.

Loop 620 may loop over all the bits of the binary numbers of dataset C, starting from the MSB and ending at the LSB.

For each processed bit, calculate vectors 630 may calculate temporary vectors D, N and T and the amount of candidates may be counted. Vector D may be created as the inverse of column i and candidacy vector N is created from the existing candidates (in vector M) and the value of bit i as reflected by vector D, which holds the inverse value of the bit being processed. Vector T may be calculated as the logical OR between the current members of the k-Mins set as reflected by vector V and the created candidacy vector N. The number of candidates in vector T may be counted as will be further described hereinbelow.

If the number of candidates is larger than needed, large set 640 may update the candidacy vector M and may continue with the next bit. If the number of candidates is smaller than needed, small set 650 may add the new candidates to the member vector V and may continue with the next bit and if the number of candidates is as required, proper set 660 may update the qualified marker vector V and may exit the loop, even if the computation did not reach the LSB.

| 1 | KMINS(int k, array C) |
|---|---|
| 2 | { |
| 3 | M := 1 |
| 4 | V := 0 |
| 5 | FOR i = MSB to i = LSB: |
| 6 | D := not(C[i]); |
| 7 | N := M AND D; |
| 8 | T := N OR V; |
| 9 | cnt = COUNT(T); |
| 10 | IF cnt > K: |
| 11 | M := N; |
| 12 | ELIF cnt < K: |
| 13 | V := T; |
| 14 | ELSE: |
| 15 | V := T; |
| 16 | EXIT; |
| 17 | ENDIF |
| 18 | ENDFOR |
| 19 | } |

FIGS. 7-11 are illustrations of an example of the calculation steps of the k-Mins processor 120 constructed and operative according to a preferred embodiment of the present invention, on the exemplary data set of FIG. 3 and the resulting vectors' content in each step of the algorithm. The needed size of the k-Mins set in this example is set to 4 as already mentioned before.

Figure 7:
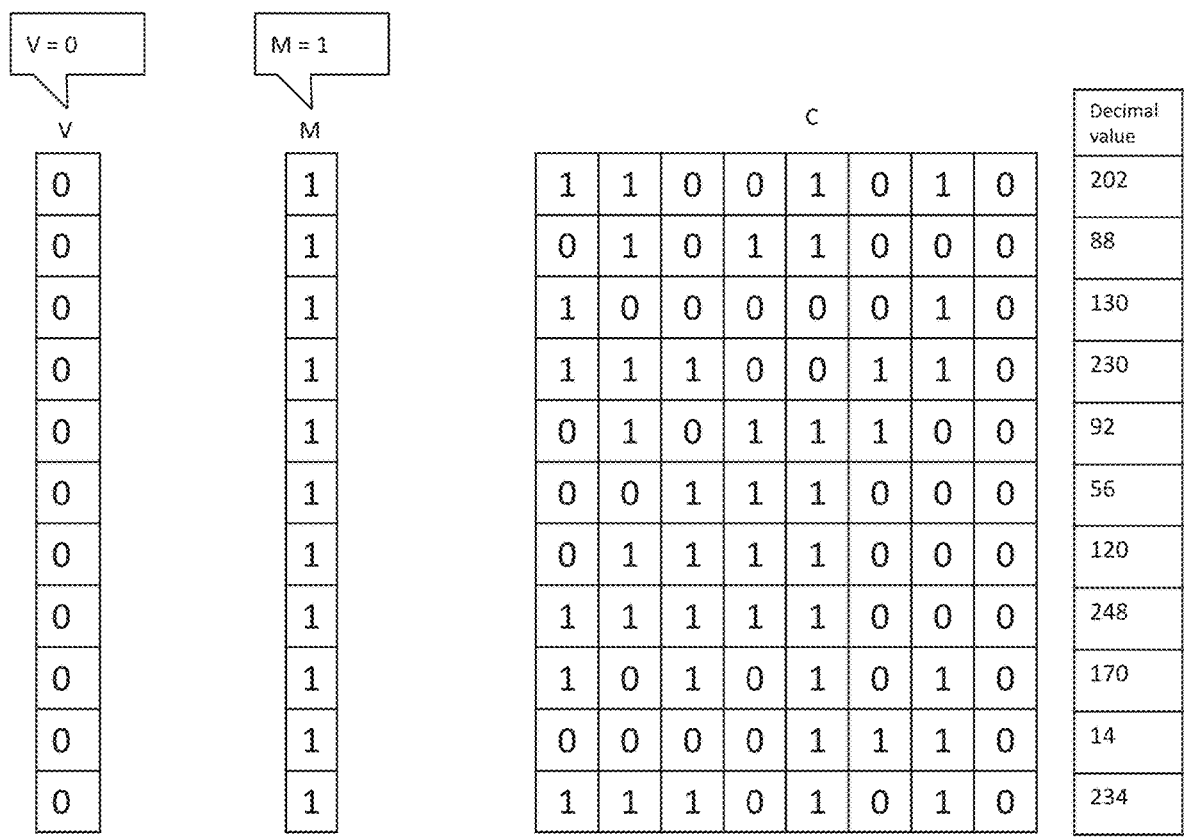

FIG. 7 is an illustration of the content of a dataset C, with the decimal value of each number to make the computation results clear, and the contents of vectors V and M after their initialization to 0 and 1 respectively.

Figure 8:
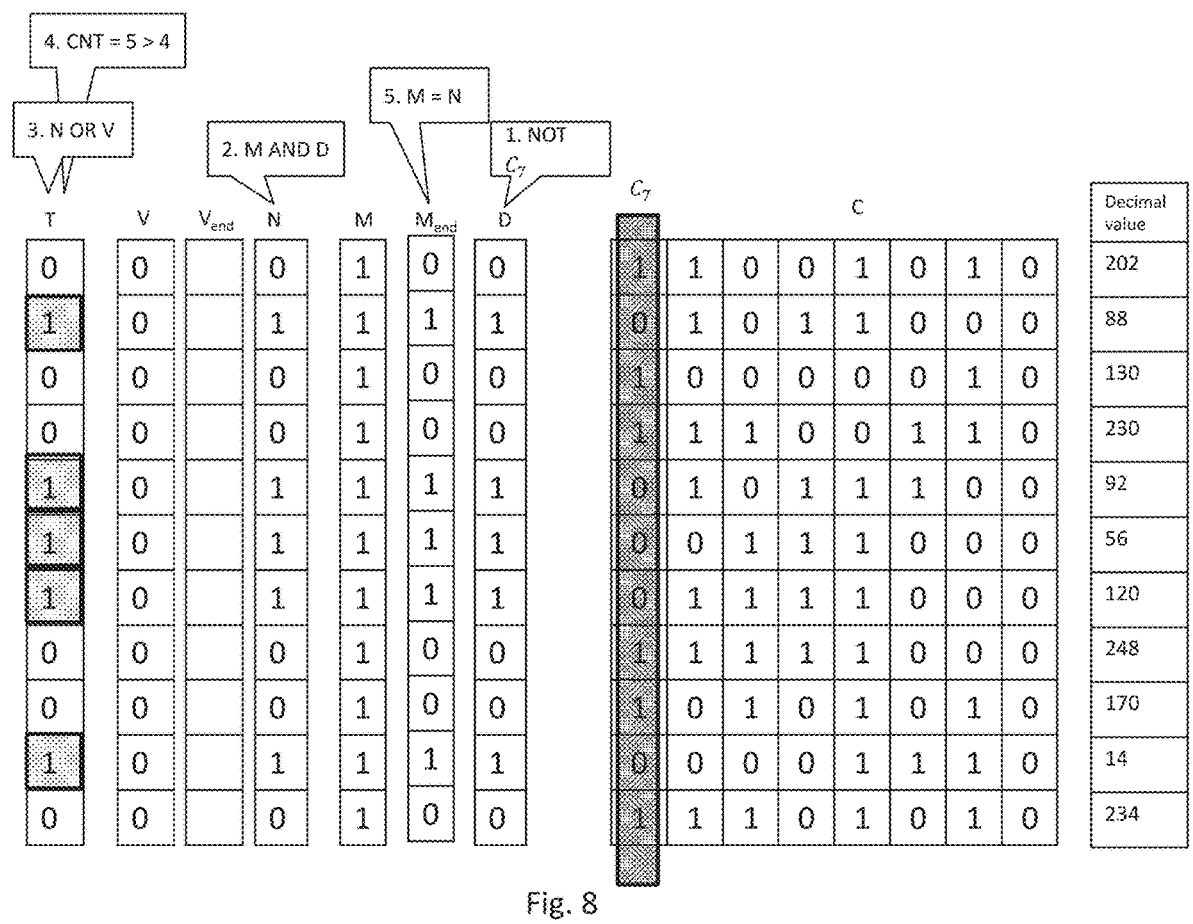
Figure 9:
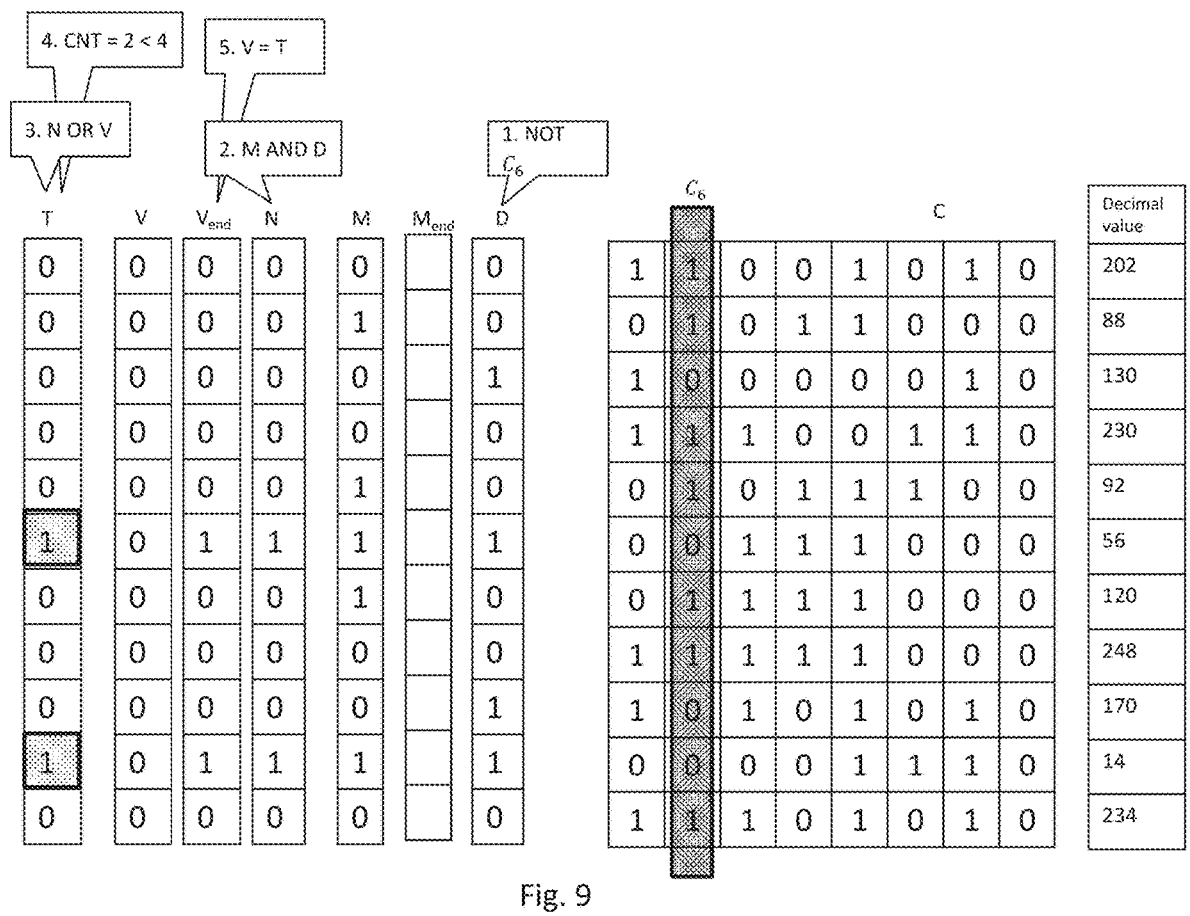

FIG. 8 is an illustration of the status of the different vectors after the iteration of the k-Mins processor 120 on the MSB which is bit number 7 in the example of dataset C. Vector D may contain the inverse value of column 7 of dataset C. Vector N may then be calculated as the logical AND operation of vector M and vector D. Vector T may then be calculated as the logical OR operation of vectors N and vector V and the number of indications in T is counted. The value of the count is 5, which is larger than the needed value of k which is 4 in the example. In this case, vector M is updated to the value of N and the algorithm continues to the next bit. Similarly, FIG. 9 is an illustration of the status of the different vectors after the iteration of the k-Mins processor 120 on the next bit which is bit number 6 in the example of dataset C. As can be seen, the value of the count in FIG. 9 is 2, which is smaller than the needed value of k=4. In this case, vector M is updated to the value of N and the algorithm continues to the next bit.

Figure 10:
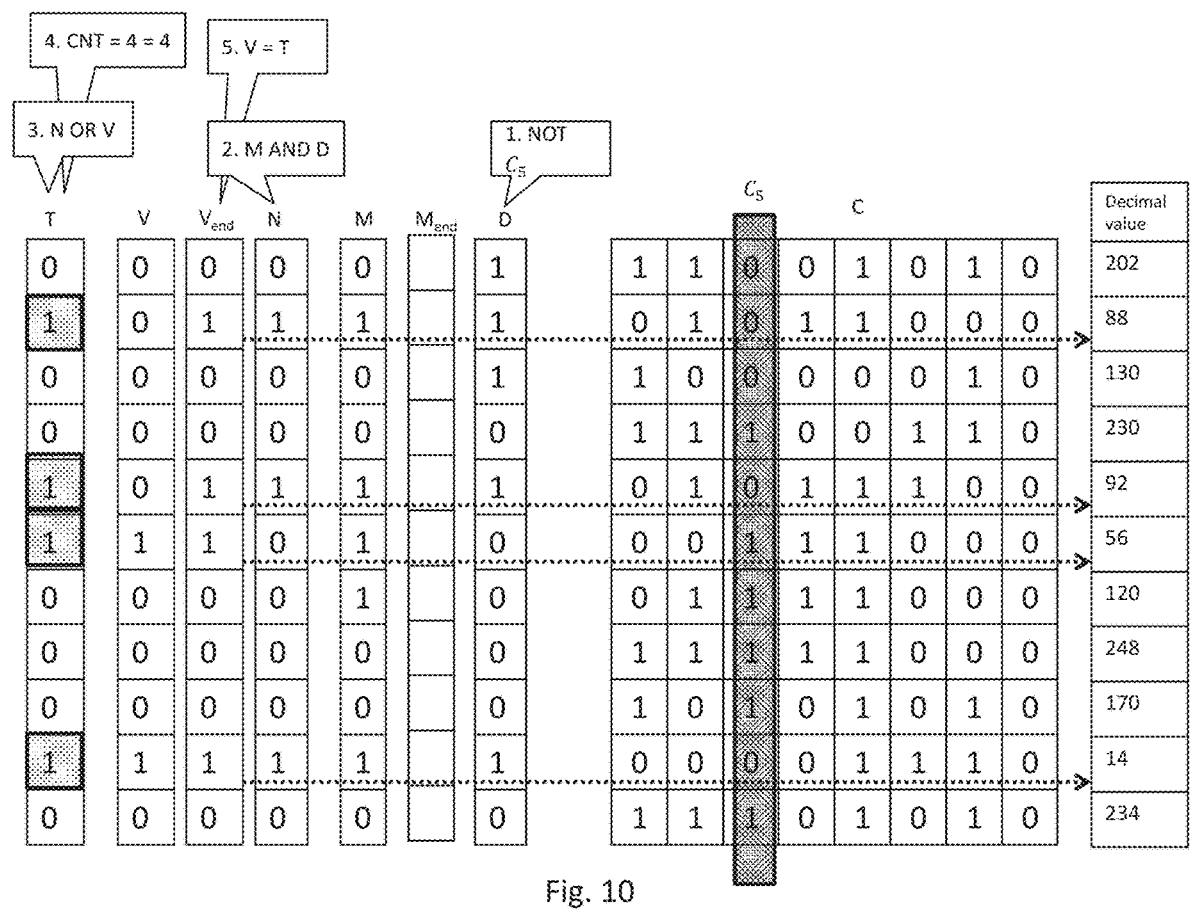

FIG. 10 is an illustration of the different vectors after the iteration of the k-Mins processor 120 on the next bit which is bit number 5. Vector D may contain the inverse value of column 5 of dataset C. Vector N may, as before, be calculated as the logical AND operation of vector M and vector D. Vector T may then be calculated as the logical OR operation of vectors N and vector V and the number of bits with value "1" is counted. The value of the count is 4 which is the needed set size thus V is updated with the value of T and the algorithm ends. Vector V at this point contains a mark (a bit value "1") in all rows indicating a small number in dataset C and as can be appreciated the correct numbers are pointed by vector V.

In the dataset of the example, there are exactly 4 binary numbers with minimum value and they may be found by the k-Mins processor 120 after 3 iterations though the number of bits of each binary number is 8. It may be appreciated that the processing complexity is bounded by the number of bits of the binary numbers and not by the dataset size.

When a binary number is present more than once in the dataset, the k-Mins processor 120 may reach the last bit of the binary numbers in the dataset and not find exactly k items to be qualified as k-Mins members. In this case, an additional set of bits representing a unique index of each binary number in the dataset may be used as additional least significant bits. As each binary number is associated with a unique index, the additional bits may guarantee to create a unique value to each item in the dataset and may provide an exact amount of items in the k-Mins set.

FIG. 11, to which reference is now made, is an illustration of an exemplary dataset C having repeated instances of binary numbers such that the size of the k-Mins set may be greater than k. (In the example of FIG. 11 there are two repeats of a binary number whose decimal value is 56 in rows 3 and 5 and three repeats of a binary number whose decimal value is 14 in rows 8, 9 and 10. Consequently there may be 5 items in the k-Mins set while k is 4). In order to reduce the number of items in the k-Mins set, the index of each binary number may be processed with the k-Mins processor 120 as the least significant bits of the binary numbers of dataset C. Since the indexes are unique, only k indexes will be in the k-Mins set. As illustrated in FIG. 11, the addition of the index bits produces a k-Mins set with exactly k=4 members.

As detailed hereinabove, the k-Mins processor 120, constructed and operative according to an embodiment of the present invention, may count the number of indications in a vector, i.e. the set bits in vector T. There are many ways to count the number of set bits in a vector, one of them is the known pyramid count that adds each number with its immediate neighbor, and then the results are added with the result two columns away, then 4 columns away etc. until the whole vector is counted.

Applicant has realized that an efficient count may be implemented in the associative memory using an RSP signal, detailed in U.S. application Ser. No. 14/594,434 filed on Jan. 1, 2015, now issued as U.S. Pat. No. 9,859,005 and assigned to the common assignee of the present invention. The RSP signal may be used for efficient large shifting of bits needed for the count of indications in large vectors. When the vectors are large, large shifts such as shifts of 16, 256, 2K and the like may be needed providing an instant shift instead of one by one shift operations.

The RSP is a wired-OR circuitry which may generate a signal responsive to positive identification of a data candidate in at least one of the columns.

FIG. 12, to which reference is now made, is a schematic illustration of one embodiment of using the RSP signal to implement an efficient shift for the count operation using an exemplary array 1200. Array 1200 may include the following columns: row 1210, vector 1220, location 1230, X-kept 1240, RSP signal 1245 and RSP column 1250.

Row 1210 may be the index of a row in array 1200. In array 1200 there may be 16 rows, however array 1200 may be of any number of rows such as 32, 64, 128, 256, 512, 1024, 2K and the like. Vector 1220 may be a vector of bits in which a bit from row n should be relocated to row 0 i.e. the value of the bit in location n should be copied to location 0 (in order, for example, to add it to the bit in row 0 of another column). In each row, the value of the bit may be marked as "y" except the value stored in row n, which is the value to be shifted, which is marked as "X". All bits of vector 1220 may have the value "0" or "1". Location column 1230 may be a column having the value "0" in all rows, expect in row n from which the bit (marked as X) is to be shifted in which the value is set to "1". X-kept 1240 may be the result of the Boolean AND operation between the value of vector 1220 and location 1230. X-kept 1240 may keep the value X stored in row n of vector 1220 and may null the value of all other rows of vector 1220.

RSP signal 1245 is the result of an OR operation performed on all cells of X-kept 1240 and may have the value X. It may be appreciated that since the value of all bits of X-kept 1240 is "0" except for the value X stored in row n, the value of the OR Boolean operation on all the cells of X-kept 1240 will be the value X. The value received in cell RSP signal 1245 may further be written into all cells of RSP 1250, including cell 0 effectively shifting the value X from row n to row 0.

The k-Mins algorithm described hereinabove may be used by the k nearest neighbors (K-NN) data mining algorithm. In K-NN D may represent a large dataset containing q objects (q enormously large). $D^P$ is one object in dataset D: $D^P$ E D and A is the object to classify. An object is defined by a vector of numerical attributes: A is defined by a vector $[A_0, A_1, \ldots A_n]$ of n attributes and $D^P$ is defined by a vector $[D_1^P, D_2^P, D_3^P, \ldots D_n^P]$ of the same n attributes. A distance, which is a binary number $C^P$ of m bits, between object A and object $D^P$, is calculated between the introduced object A and each object $D^P$ in the dataset D. The distance $C^P$ may represent the cosine similarity between two non-zero vectors. The known in the art cosine similarity associates each pair of vectors with a scalar quantity and is known as the inner product of the vectors.

The cosine distance may be calculated using the formula:

$$C^p = \frac{\sum_{i=0}^{n} D_i^p A_i}{\sqrt{\sum_{i=0}^{n} (D_i^p)^2} \sqrt{\sum_{i=0}^{n} (A_i)^2}}$$

The distance $C^P$ is calculated between object A and each object $D^P$ in the dataset and is stored as a binary number in a large dataset C. The k-Mins algorithm may find the k smallest binary numbers in C representing the k nearest neighbors of A in a constant time.

It may be appreciated that the number of steps needed to complete the calculation of the k-Mins algorithm, for usage for example by the K-NN algorithm, depends only on the size of an object stored in the dataset (the number of bits composing the binary number indicating the distance between A and an object in the dataset, i.e. m) and not the number of objects in the dataset (q) that may be extremely big. The calculation of the algorithm may be done on all rows of the dataset simultaneously. It may also be appreciated that any addition of objects to the dataset may not prolong the processing time of the k-Mins processor 120. If used in an online application, the retrieval time of an object from the dataset may remain the same as the dataset grows.

It may be appreciated that the throughput of a query using the invention described hereinabove may be improved by starting the calculation of the next query before the result of the current query is returned to the user. It may also be appreciated that the k-Mins processor 120 may create an ordered list of items instead of a set by adding a numeral indication to each binary number to mark the iteration identifier in which an object has changed its status from candidate to qualified. Since the smaller binary numbers become qualified sooner than the larger binary numbers, the iteration identifier of the smaller binary number may also be smaller than those of the larger binary numbers in dataset C.

Unless specifically stated otherwise, as apparent from the preceding discussions, it is appreciated that, throughout the specification, discussions of k minimum numbers apply mutatis mutandis to k maximum numbers and vice versa, and may also be referred to as extreme numbers.

Applicant has realized that the K-NN process may be utilized to improve the speed of classifier and recognition systems in numerous fields such as, voice recognition, image and video recognition, recommender systems, natural language processing and the like. Applicant has also realized that the K-NN algorithm, constructed and operative in accordance with a preferred embodiment of the present invention, may be used in fields where it was not used before as it provides a superior computation complexity of O(l).

Figure 13:
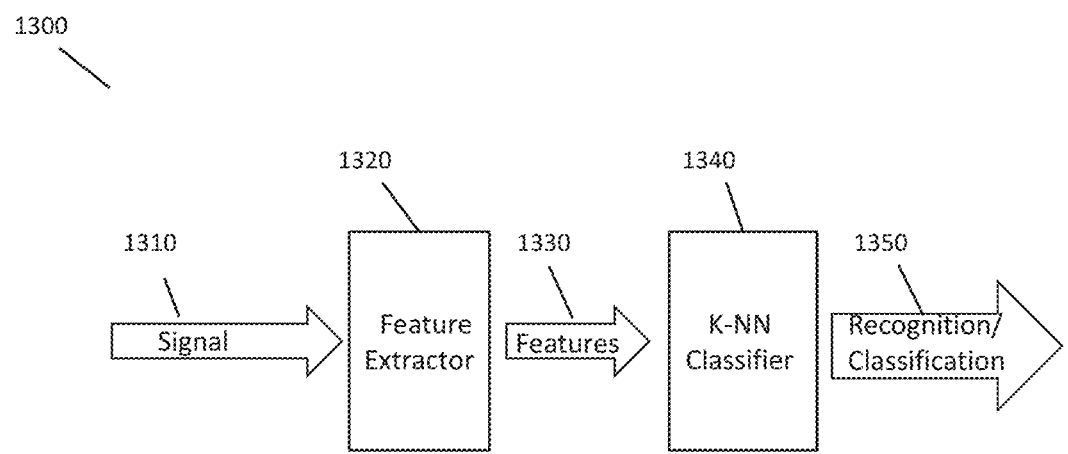
FIG. 13 is a schematic illustration of the flow of events of numerous data mining cases.

Reference is now made to FIG. 13 which illustrates the flow of events of numerous data mining cases that may, in some point, use the K-NN algorithm for classification. System 1300 may comprise a feature extractor 1320 to extract features 1330 from an input signal 1310, and a K-NN classifier 1340 to generate a recognition and/or a classification 1350 of an item in the input signal 1310.

Signal 1310 may be an image, a voice, a document, a video and the like. For images, feature extractor 1320 may be a convolution neural network (CNN) in a learning phase and the like. For speech, features 1330 may be mel-frequency cepstral coefficients (MFCC). For documents, the features may be information gain (IG), Chi Square (CHI), mutual information (MI), Calculated Ng-Goh-Low coefficient values (NGL), Calculated Galavotti-Sebastiani-Simi coefficient values (GSS), Relevancy score (RS), MSF DF, term frequency for the document frequency (TFDF) etc. The extracted features may be stored in a device such as memory computation device 100 of FIG. 1 on which K-NN classifier 1340 may operate. Classification 1350 may be the predicted class of the item such as an image recognition, or classification for an image signal; speech detection, or noise cancelation for an audio signal; document classification or spam detection for a document signal; and the like.

For example, it may be appreciated the CNN network may start learning using a training set of items for which the classification is known. After a short learning period, first convergence of the network is observed. The learning phase generally last hours and days for a full convergence of a stable and reliable network.

In accordance with a preferred embodiment of the present invention, the learning may be stopped shortly after the beginning of convergence and the network may be stored in this "transitional" state, before full convergence is achieved.

In accordance with a preferred embodiment of the present invention, the activation values of the training set calculated using the network in its "transitional" state may be defined as the features 1330 of each item of the training set and may be stored along with the classification of each such item. It may be appreciated that the features may be normalized—i.e. the sum of the square of all activations of each item may be set to add up to 1.0.

When a new item to be classified is received, the CNN is performed on the item using the network at its transitional state and the K-NN procedure, using the stored features, may be used to classify the new item. The K-NN classification of the new item may be performed by calculating the cosine similarity between the set of features of the new object and the items in the database, and classifying the new item with the class of the k nearest neighbors as described in detail hereinabove.

It may be appreciated that the K-NN algorithm, using the K-mins method described hereinabove, may replace the last portion of a standard CNN.

It will be appreciated that the addition of the K-NN algorithm may provide a high classification accuracy with partially trained neural networks while dramatically reducing the training period time.

Using the CNN together with K-NN for classification may replace the fully connected part of the network in applications like image and video recognition, recommender systems, natural language processing and the like.

Applicant has realized that the KNN process described hereinabove may be useful for natural language processing (NLP).

Consider a long text such as a book, a paper agreement, or even the full Wikipedia. Prior art natural language processors (NLPs) generate a neural network that can ask a set of questions of the long text and can get the right answers. For this, they use a recurrent neural network (RNN). In accordance with a preferred embodiment of the present invention, the long text may be stored in memory 110 and the associative memory array 140 with the KNN process described hereinabove may answer complex questions with a constant computation complexity of O(1). It will be appreciated that NLP may be utilized also for language translations, malware detection and more.

The input to a neural network is a key vector and the output is a value vector, generated inside the neural network by a similarity search between the input key and all other keys in the neural network. For answering questions, the output can be looped back as a next query, for as many iterations as necessary until an answer is found. Applicant has realized that an associative processing unit (APU), such as memory computation device 100, can do any function of search, such as cosine similarity which is not an exact match, to achieve all that is needed for natural language processing with a neural network.

End to End Memory Network Architecture—Prior Art

Input representation: A story is made up of sentences $\{x_1\}$ from which a set of feature vectors $m_i$ are generated by a pre-taught RNN, an auto encoder, or any other method, such as k-NN. The features are stored in the neural network. A question q is then also converted to a feature vector (of the same dimensions as the sentences) using another pre-taught embedding. The neural network then computes a similarity as the matrix multiplication of q with each feature $m_i$. The SoftMax algorithm is then computed to get a probabilities vector. SoftMax can be performed on all the neural network or on a K nearest Neighbor vector.

Output Representation:

To generate the output, the probabilities vector is multiplied with modified feature vectors $c_i$ (typically either the same as the features $m_i$ or very similar thereto). After the multiplication, the processor accumulates all N products or just the k nearest neighbors to obtain the output support vector (this result is an intermediate answer, something that helps to get the right answer).

Generating the Final Prediction:

the intermediate answer is merged with the original question either as a new query for another hop (in a multi-layer variation of the model) or at the final stage (after 3 hops). The predicted answer is then generated by multiplying the value vector by their associated SoftMax probabilities and then adding all vectors to one vector called an "attention vector".

Associative Implementation

In accordance with a preferred embodiment of the present invention, since memory computation device 100 is fully scalable, it does not have any limitations on the size of the text. It can store millions of sentences. A typical associative memory server card may hold tens of millions of sentences, enough to store a huge data base. For example, the Wikipedia has 2 billion English words. Assuming that these are divided into 500 million sentences, the entire Wikipedia may be stored in 30-50 associative memory servers, or in a single server if using pre-hashing. In accordance with a preferred embodiment of the present invention and as described in more detail hereinbelow, all execution steps happen to all sentences in parallel and are of O(1) complexity.

Memory computation device 100 may be formed of any suitable memory array, such as an SRAM, a non-volatile, a volatile, and a non-destructive array and may be formed into a plurality of bit line processors 114, each processing one bit of a word and each word being stored in a column of associative memory array 140, as discussed in U.S. Pat. No. 9,418,719 (P-13001-US), assigned to the common assignee of the present invention and incorporated herein by reference.

Figure 14:
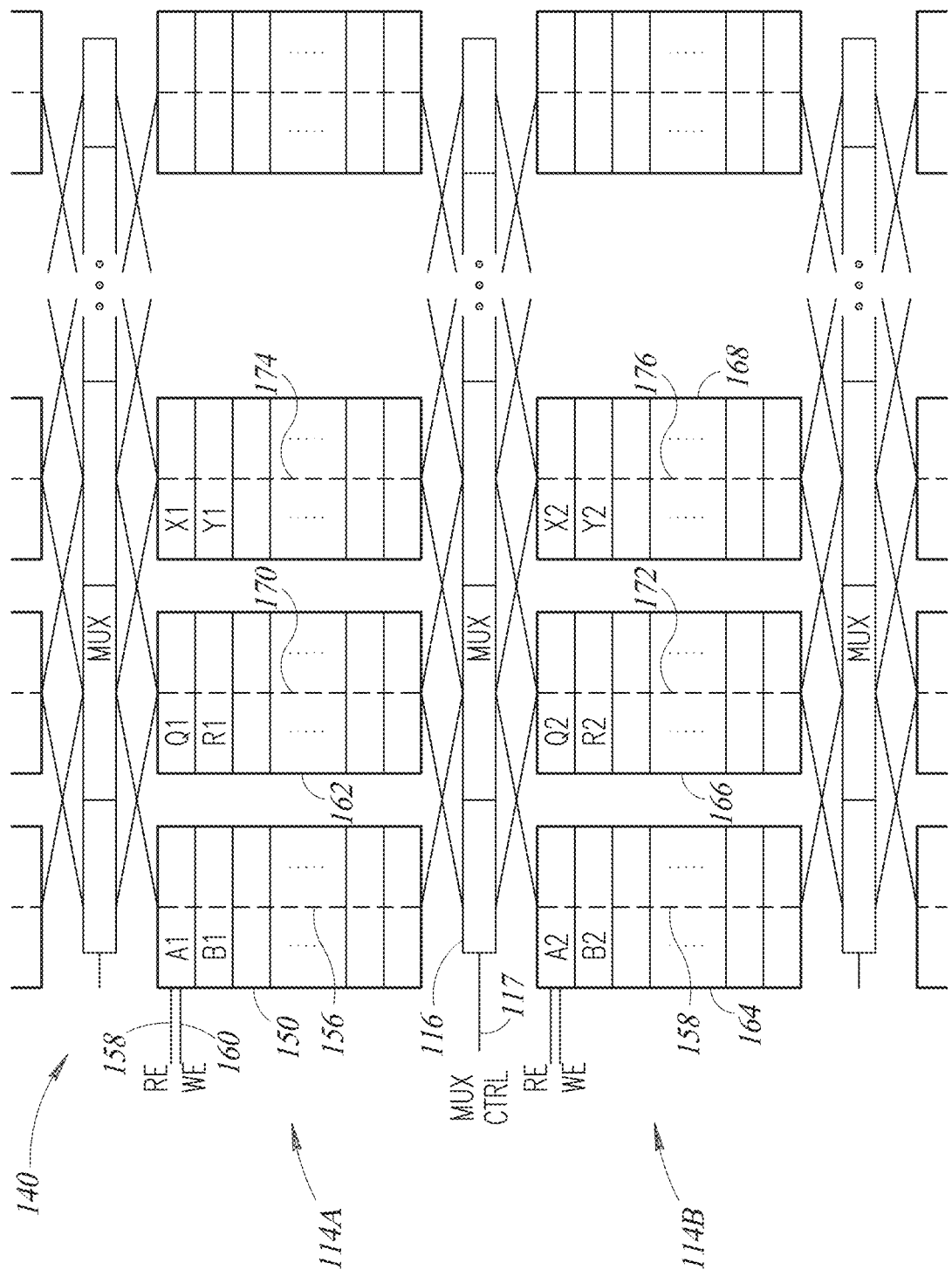
FIG. 14 is a schematic illustration of a memory array having multiple bit line processors.

Thus, each column of array 140 may have multiple bit line processors. This may be seen in FIG. 14, to which reference is now briefly made, which shows a portion of array 140 where 6 exemplary 2-bit words are to be processed, A, B, Q, R, X and Y. Bits A1 and B1 may be stored in bit line processor 114A, along bit line 156 while bits A2 and B2 may be stored in section 114B along bit line 158. Bits Q1 and R1 may be stored in bit line processor 114A along bit line 170 while bits Q2 and R2 may be stored in bit line processor 114B along bit line 172. Bits X1 and y1 may be stored in bit line processor 114A along bit line 174 while bits X2 and Y2 may be stored in bit line processor 114B along bit line 176.

Typically, for an M bit word, there may be M sections, each storing a different bit of the word. Each section may have a significant number N, such as 2048, of bit lines and thus, of bit line processors. Each section may provide a row of bit line processors. Thus, N M-bit words may be processed in parallel, where each bit may be processed by separate bit line processors, in parallel.

A typical cell column, such as cell column 150, may store the input data to be processed in the first few cells of the column. In FIG. 5, the bits of words A, Q and X are stored in the first cells of the columns while the bits of words B, R and Y are stored in the second cells of the columns. In accordance with a preferred embodiment of the present invention, the remaining cells in each column (there may be 20-30 cells in a column) may be left as temporary storage for use during the processing operation.

The multiplexers may connect the rows of bit line processors and a row decoder may activate the appropriate cells in each bit line processor. As described hereinabove, a row of cells in the memory array are connected by word lines and thus, the decoder may activate the relevant word lines of cells of bit line processors for reading and the relevant word line in a different set of bit line processors for writing.

Figure 15:
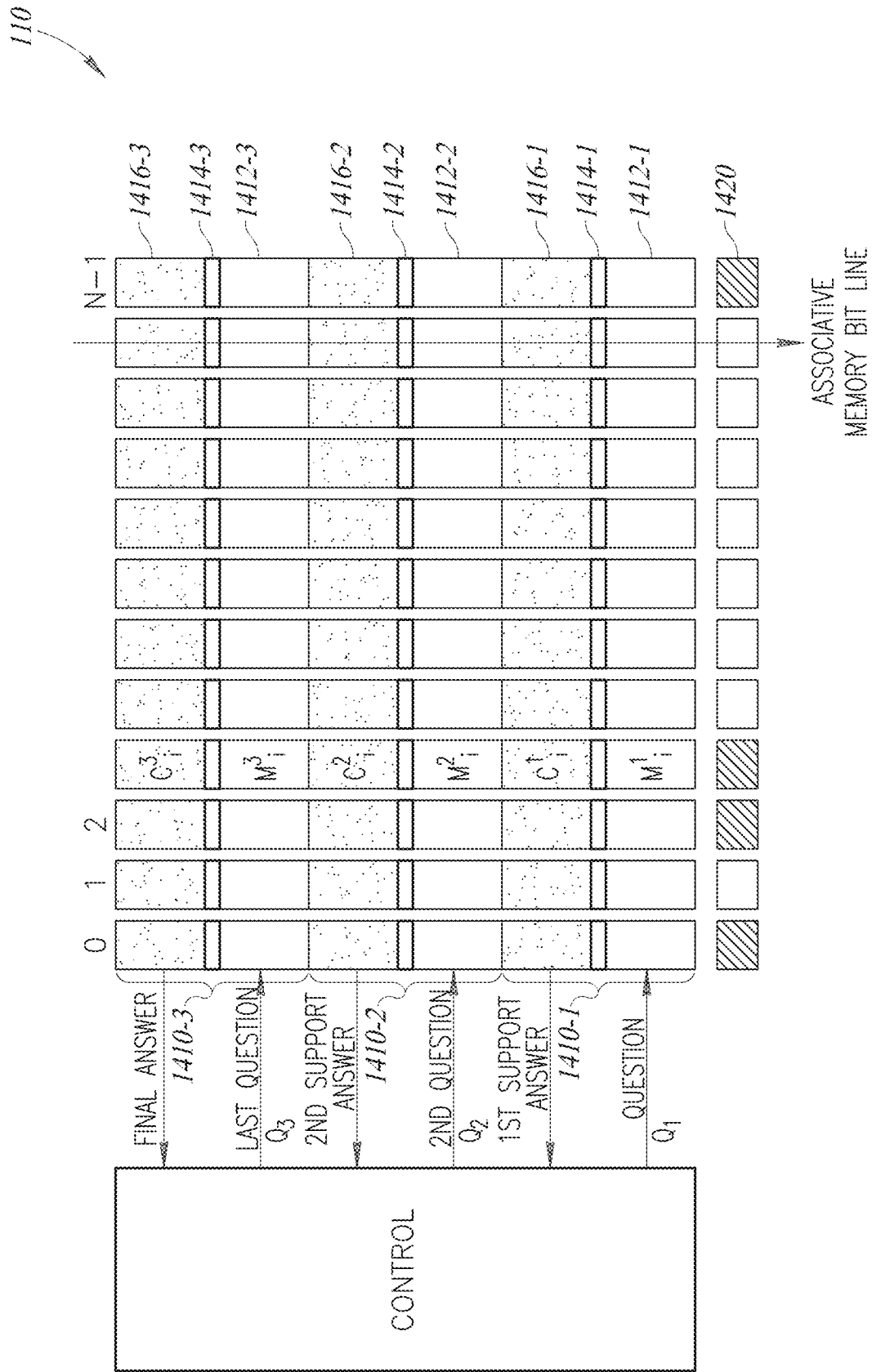
FIG. 15 is a schematic illustration of an associative memory layout, constructive and operative to implement an end-to-end memory network for natural language processing.

For the natural language processing described hereinabove, the data organization in the associative memory is shown in FIG. 15, to which reference is now made. There are three major portions 1410-$j$, one for each of the three iterations required to generate a result. Each portion, in turn, may be divided into three operative sections, a similarity section 1412-$j$ for computing a similarity value for each column, a SoftMax section 1414-$j$ for computing a SoftMax calculation on the similarity results and a value section 1416-$j$ for determining an attention vector or support answer. It will be appreciated that the columns of each section are aligned with each other as are the columns of the different iterations. Thus, an operation on feature x will generally happen within the same column in all operations.

The feature or key vectors $M^1_i$ of the N input sentences are stored in a portion 1412-1 of memory 110, where each feature vector $M^1_i$ is stored in a separate column. Thus, feature vector $M^1_0$ is stored in column 0, $M^1_i$ is stored in column 1, etc. and each bit of each vector $M^1_i$ may be stored in its own bit line processor 114. As discussed hereinabove, the feature vectors may be the output of a pre-trained neural network or any other vectorizing feature extractor and may be the features of a word, a sentence, a document, etc., as desired.

Modified feature vectors $C^1_i$ associated with the N input sentences may have the same values of the associated $M^j_i$ or some or all of the vectors may be modified in some suitable way. Modified feature vectors $C^j_i$ may be initially stored in value section 1416-1. Similar data may be stored in similarity and value sections 1412-$j$ and 1416-$j$, respectively for the other iterations j.

For similarity sections 1410-$j$, memory computation device 100 may implement a dot matrix multiplication (or a cosine similarity) with an input vector $q_j$ for each column in parallel and may store the results, which may be the distance between the input vector and the feature in each column of similarity sections 1410-$j$, in the associated bit line processors 114, as discussed hereinabove. An exemplary matrix multiplication operation is described in U.S. patent application Ser. No. 15/466,889, assigned to the common assignees of the present invention and incorporated herein by reference. The input vector may be the initial question for iteration 1 and may be follow on questions in the other iterations j.

A marker vector T may be used for specifying selected columns if needed, to forget, or to insert and update new input vectors and may be implemented as a row 1420, operative for all iterations.

The SoftMax operation, described in the Wikipedia article, "SoftMax function", may be implemented in SoftMax sections 1414-$j$ on the result of the dot matrix or cosine similarity operation performed in associated similarity section 1412-$j$ (on the columns selected by marker vector 7). The SoftMax operation may determine a probability of occurrence for each active column, based on the similarity results of portion 1412. The probability of occurrence has a value between 0 and 1 and the probabilities sum to 1.0.

The SoftMax operation may comprise many exponential operations, which may be implemented as Taylor series approximations, with the intermediate data of each operation being stored in the bit line processors of the relevant SoftMax portion 1414-$j$.

In value sections 1416-$j$, the modified feature vectors $C^i_j$ may be multiplied, each in its own bit line processor 114, by their associated SoftMax values. The $1^{st}$ support answer may then be produced as a vector sum of the multiplied $C^i_j$ vectors. Such a sum may be accumulated horizontally, in an attention operation, across all of the columns selected by marker vector T. The vector result, a weighted sum of the key vectors, weighted by the SoftMax values, may be provided to the controller to be used to generate the question for the next hop or iteration. FIG. 15 shows the initial portion, for the initial iteration, at the bottom of memory array 110 with the data of further iterations stored in portions there above. Three iterations are shown, each with an input question $q_j$ and a support or final answer as output.

It will be appreciated that the initial question $q_1$ may be generated by a question generator using a pre-trained neural network, external to memory computation device 100. The remaining questions $q_j$ until the solution, typically the third iteration but more iterations are possible, may be combinations of the original vector question and the attention vector.

The combination may be based on an external neural network with two input vectors and one output vector. The input vectors are the original question vector $q_1$ and the attention of the previous iteration and the output is the new vector question. This neural network may be implemented by matrix multiplication on bit lines of memory or may be implemented externally.

It will be appreciated that the initial data stored in similarity sections 1412-$j$ may be the same (i.e. the distance between questions $q_j$ are with respect to the same data). Similarly, the initial value data stored in value sections 1416-$j$ may be the same (i.e. the data to be multiplied by the SoftMax values are the same).

Performance

With all sentence features stored in memory, matrix multiplication takes 100 cycles times the size of the query vector. Assuming up to 10 features per sentence, we get 1000 clocks to for all N sentences in parallel (N can be millions) or 1 μsec (with a 1 Ghz clock) per all N. SoftMax takes about 1 μsec and the multiply and accumulate operations takes 4 μsec. 3 hops/iterations takes 3×(1+1+4)≈20 μsec, enabling 50,000 questions per second.

Figure 16:
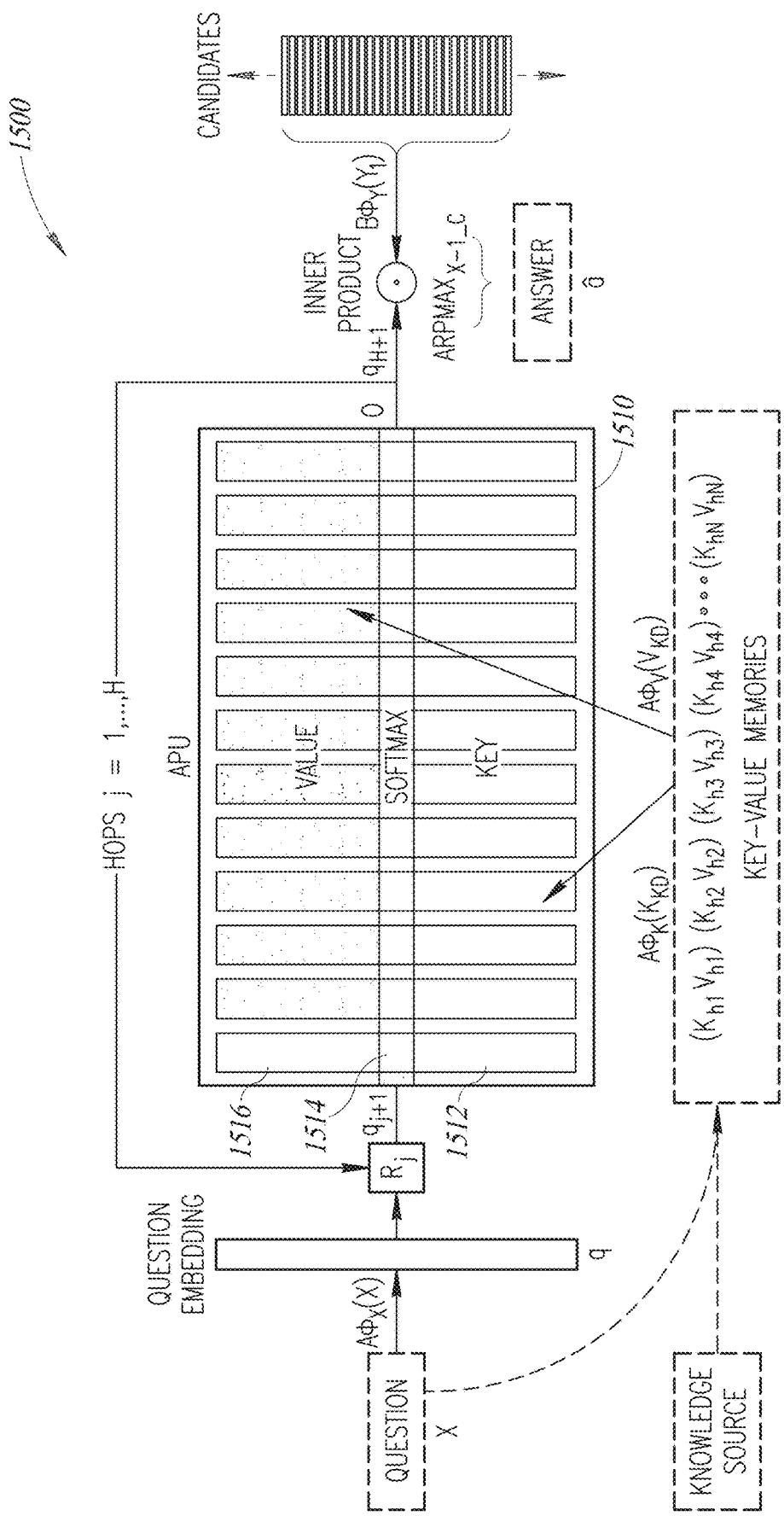
FIG. 16 is a schematic illustration of an associative processing unit to implement all hops of the network inside the memory in constant time.

An alternative system 1500, shown in FIG. 16 to which reference is now briefly made, may comprise associative memory 1510, which may be large enough to handle only a single iteration, and other elements handling the remaining calculations.

As in the previous embodiment, associative memory 1510 may comprise a similarity section 1512 for operating on the feature vectors, here called "keys", a SoftMax section 1514 for implementing the SoftMax operation and a value section 1516 for operating on values associated with the feature vectors. This embodiment may execute all hops inside memory 1510 in constant time. As can be seen in FIG. 16, some operations occur in memory 1510 while other operations occur external to memory 1510. Performance is about the same as the end-to-end implementation, about 6 μsec per hop.

Flexibility to any Long Memory Network

It will be appreciated that, since the associative processor has all the capabilities of search-by-content with a constant time, parallel compute on all bit lines of memory, it may represent various types of memory networks, for example, Key-Value Memory Networks for Directly Reading Documents (Miller, Jason, et. al., EMNLP 2016).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for natural language processing, the system comprising:
a memory array having rows and columns, said memory array being divided into a similarity section initially storing a plurality of feature or key vectors in columns thereof, wherein each of said vectors has a fixed size, a SoftMax section in which to determine probabilities of occurrence of said feature or key vectors, a value section initially storing a plurality of modified feature vectors in columns thereof, and a marker section storing a marker vector in a row thereof specifying columns to be operated upon, wherein said sections being contiguous to one another such that a column of one section of said sections is contiguous with a column of a neighboring section and operations in one or more columns of said memory array are associated with one feature vector to be processed, and wherein said memory array comprises a bit line processor per column of each said section, each said bit line processor operating on one bit of data of its associated section; and
an in-memory processor operating in a constant time as a function of said fixed size and irrespective of the number of said vectors, said processor to activate said memory array to perform the following operations in parallel in each column indicated by said marker vector:
a similarity operation in said similarity section between a vector question and each said feature vector stored in each said indicated column to generate a similarity output in each said indicated column;
a SoftMax operation in said SoftMax section on each said similarity output in said similarity section to determine an associated SoftMax value for each said indicated feature vector, wherein an intermediate output of exponential operations of said SoftMax operation is stored in said bit-line processor of said SoftMax section of each said indicated column; and
a multiplication operation in said value section to multiply each said associated SoftMax value in said SoftMax section by each said modified feature vector stored in each said indicated column to generate a multiplication output in each said indicated column;
said in-memory processor to also perform a horizontal vector sum in said value section of said multiplication output in each said indicated column to accumulate an attention vector sum, said vector sum to be used to generate a new vector question for a further iteration or to generate an output value in a final iteration.

2. The system according to claim 1 wherein said memory array comprises operational portions, one portion per iteration of a natural language processing operation, each portion being divided into said similarity, SoftMax, and value sections.

3. The system according to claim 1 wherein said memory array is one of: an SRAM, a non-volatile, a volatile, and a non-destructive array.

4. The system according to claim 1 and also comprising a neural network feature extractor to generate said feature and modified feature vectors.

5. The system according to claim 1 and wherein said feature vectors comprise features of a word, a sentence, or a document.

6. The system according to claim 1 wherein said feature vectors are the output of a pre-trained neural network.

7. The system according to claim 1 and also comprising a pre-trained neural network to generate an initial vector question.

8. The system according to claim 7 and also comprising a question generator to generate a further question from said initial vector question and said attention vector sum.

9. The system according to claim 8 wherein said question generator is a neural network.

10. The system according to claim 8 and wherein said question generator is implemented as a matrix multiplier on bit lines of said memory array.

11. A method for natural language processing, the method comprising:
having a memory array having rows and columns, said memory array being divided into a similarity section initially storing a plurality of feature or key vectors in columns thereof, wherein each of said vectors has a fixed size, a SoftMax section in which to determine probabilities of occurrence of said feature or key vectors, a value section initially storing a plurality of modified feature vectors in columns thereof, and a marker section storing a marker vector in a row thereof specifying columns to be operated upon, said sections being contiguous to one another such that a column of one section of said sections is contiguous with a column of a neighboring section and operations in one or more columns of said memory array are associated with one feature vector to be processed, and wherein said memory array comprises a bit line processor per column of each said section, each said bit line processor operating on one bit of data of its associated section; and activating said memory array to operate in a constant time as a function of said fixed size and irrespective of the number of said vectors to perform the following operations in parallel in each column indicated by said marker vector:
- performing a similarity operation in said similarity section between a vector question and each said feature vector stored in each said indicated column to generate a similarity output in each said indicated column;
- performing a SoftMax operation in said SoftMax section on each said similarity output in said similarity section to determine an associated SoftMax value for each said indicated feature vector, wherein an intermediate output of exponential operations of said SoftMax operation is stored in said bit-line processor of said SoftMax section of each said indicated column; and
- performing a multiplication operation in said value section to multiply each said associated SoftMax value in said SoftMax section by each said modified feature vector stored in each said indicated column to generate a multiplication output in each said indicated column;
- performing a horizontal vector sum operation in said value section of said multiplication output in each said indicated column to accumulate an attention vector sum, said vector sum to be used to generate a new vector question for a further iteration or to generate an output value in a final iteration.

12. The method according to claim 11 and also comprising generating said feature and modified feature vectors with a neural network and storing them into said similarity and value sections, respectively.

13. The method according to claim 11 and wherein said feature vectors comprise features of a word, a sentence, or a document.

14. The method according to claim 11 and also comprising generating an initial vector question using a pre-trained neural network.

15. The method according to claim 14 and also comprising generating a further question from said initial vector question and said attention vector sum.

16. The method according to claim 15 wherein generating a further question utilizes a neural network.

17. The method according to claim 15 and wherein said generating a further question comprises performing matrix multiplication on bit lines of said memory array.

* * * * *